(12) United States Patent
Andrenko et al.

(10) Patent No.: US 7,961,103 B2
(45) Date of Patent: Jun. 14, 2011

(54) WIRELESS TAG AND ELECTRICALLY CONDUCTIVE PIPE HAVING WIRELESS TAG

(75) Inventors: Andrey S. Andrenko, Kawasaki (JP); Toru Maniwa, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 12/318,723

(22) Filed: Jan. 7, 2009

(65) Prior Publication Data

US 2009/0273446 A1 Nov. 5, 2009

(30) Foreign Application Priority Data

May 1, 2008 (JP) .................................. 2008-119911

(51) Int. Cl.
G08B 13/14 (2006.01)
H04Q 5/22 (2006.01)
F23Q 7/02 (2006.01)
F42C 21/00 (2006.01)

(52) U.S. Cl. ................. 340/572.1; 340/572.8; 340/10.1; 102/206

(58) Field of Classification Search .... 340/572.1–572.9, 340/10.1; 343/860, 861, 862, 872, 873, 898; 102/206, 214, 215

See application file for complete search history.

(56) References Cited

U.S. PATENT DOCUMENTS

| | | | | |
|---|---|---|---|---|
| 6,543,362 B1 * | 4/2003 | Muskat | ......................... | 102/202 |
| 7,378,970 B2 * | 5/2008 | Hayashi et al. | ............. | 340/572.7 |
| 7,541,932 B2 * | 6/2009 | Lee et al. | .................... | 340/572.8 |
| 7,762,189 B2 * | 7/2010 | Ritchie et al. | .............. | 102/202.7 |
| 2006/0022056 A1 * | 2/2006 | Sakama et al. | ................ | 235/492 |
| 2009/0121878 A1 * | 5/2009 | Lai | .............. | 340/572.7 |

FOREIGN PATENT DOCUMENTS

| | | |
|---|---|---|
| JP | A-2006-125650 | 5/2006 |
| WO | WO 2006/128257 | * 12/2006 |

* cited by examiner

Primary Examiner — Jennifer Mehmood
(74) Attorney, Agent, or Firm — Murphy & King, PC (57) ABSTRACT

A wireless tag adapted for mounting inside a hollow electrically conductive pipe, includes: a contact placed in contact with the electrically conductive pipe so as to be electrically connected to the electrically conductive pipe; a lead wire placed inside the electrically conductive pipe along a longitudinal direction of the electrically conductive pipe and spaced a prescribed distance away from an inside wall of the electrically conductive pipe, thereby forming a coaxial line together with the electrically conductive pipe; and a wireless tag circuit, electrically connected at one end to the contact and at the other end to the lead wire, for generating a response signal in response to an interrogation signal transmitted from a reader/writer.

8 Claims, 9 Drawing Sheets

FIG. 2A

DIRECTION
OF RADIATION
FROM
READER/WRITER →

FIG. 2B

DIRECTION
OF RADIATION
FROM
READER/WRITER →

WIRELESS TAG AND ELECTRICALLY CONDUCTIVE PIPE HAVING WIRELESS TAG

CROSS-REFERENCE TO RELATED APPLICATION

The Applicant is based upon and claims the benefit of priority of the prior Japanese Patent Application No. 2008-119911, filed on May 1, 2008, and the entire content of JP 2008-119911 is hereby incorporated by reference.

FIELD

The embodiments discussed herein are directed to a wireless tag and an electrically conductive pipe having a wireless tag.

BACKGROUND

In recent years, systems that use radio frequency identification (hereinafter abbreviated RFID) technology have come into wide use in such applications as inventory management and logistics management. An RFID system includes a reader/writer and a wireless tag attached to each article or the like to be managed, and wireless communications are performed between the reader/writer and the wireless tag. The reader/writer is capable of identifying each individual wireless tag by reading the identification information, etc. stored on the wireless tag. The system can thus manage each individual article to which such a wireless tag is attached.

Japanese Laid-open Patent Publication No. 2006-125650 discloses that a wireless tag is attached to the inside of a metal capsule of a blasting cap to be managed, in order to prevent the wireless tag from being removed and to provide a waterproof structure, and that a lead wire brought outside the metal capsule is used as a monopole antenna.

SUMMARY

According to one embodiment, there is provided a wireless tag adapted for mounting inside a hollow electrically conductive pipe. The wireless tag includes: a contact placed in contact with the electrically conductive pipe so as to be electrically connected to the electrically conductive pipe; a lead wire placed inside the electrically conductive pipe along a longitudinal direction of the electrically conductive pipe and spaced a prescribed distance away from an inside wall of the electrically conductive pipe, thereby forming a coaxial line together with the electrically conductive pipe; and a wireless tag circuit, electrically connected at one end to the contact and at the other end to the lead wire, for generating a response signal in response to an interrogation signal transmitted from a reader/writer.

According to another embodiment, there is provided an electrically conductive pipe. The electrically conductive pipe includes: a hollow electrically conductive pipe member; a contact electrically connected to the pipe member; a lead wire placed inside the pipe member along a longitudinal direction of the pipe member and spaced a prescribed distance away from an inside wall of the pipe member, thereby forming a coaxial line together with the pipe member; and a wireless tag circuit, electrically connected at one end to the contact and at the other end to the lead wire, for generating a response signal in response to an interrogation signal transmitted from a reader/writer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and other features and advantages of the present invention will be better understood by referring to the following detailed description, taken together with the drawings wherein.

DESCRIPTION OF EMBODIMENTS

The inventors of the present application have studied systems that use RFID technology such as described above for application to metal pipe management. In such applications also, it is desirable that the wireless tag be attached to the inside of the metal pipe in order to prevent removal and breakage of the wireless tag. Further, generally metal pipes are used by adjusting the pipe length according to the purpose, and some pipes are constructed so that one end thereof can be fitted into an end of another pipe for connection. In view of this, it is desirable that the wireless tag be attached further inwardly of the fitting portion. The length of the fitting portion can extend as long as about 150 mm, for example, in the case of a metal pipe of 30-mm radius.

However, in the case of an electrically conductive pipe such as a metal pipe formed from an electrically conductive material, radiowaves at frequencies lower than the cutoff frequency of the pipe cannot propagate into the interior of the pipe. Assuming that the metal pipe is a circular waveguide, the cutoff frequency fc is given by the following equation.

$$f_c = \frac{3 \times 10^5}{3.413 b} \text{ (MHz)} \tag{1}$$

where b is the radius (in millimeters) of the metal pipe. For example, in the case of a metal pipe of 30-mm radius, the cutoff frequency fc is about 2.9 GHz. On the other hand, the frequencies of the radiowaves or electromagnetic waves currently used in RFID systems are, for example, 2.45 GHz in the microwave frequency range, 860 to 960 MHz in the UHF range, 13.56 MHz in the HF range, etc. all of which are lower than the cutoff frequency fc. Accordingly, such radiowaves or electromagnetic waves cannot propagate into the interior of the metal pipe. One possible solution to this would be to mount inside the metal pipe a wireless tag that uses a lead wire brought outside the metal pipe as an antenna, as disclosed in Japanese Unexamined Patent Publication No. 2006-125650.

However, there are cases where metal pipes are used as materials of a structure, such as construction materials, or used to build the frame of a scaffold; in such cases, the pipes are handled in a variety of ways, for example, the pipes may be connected end to end, as described above, or may be lifted by a crane with the ends of the pipes not connected, or may be stored by stacking one on top another. Accordingly, if the antenna of the wireless tag protrudes outside the metal pipe, the lead wire may be broken when connecting the pipe to another pipe, or an excessive load may be applied to the lead wire, causing the wireless tag connected to the lead wire to disconnect.

Accordingly, the wireless tags according to a variety of embodiments of the present invention, which are adapted to be mounted into metal pipes, will be described below.

A wireless tag according to a first embodiment will be described below with reference to the relevant drawings.

The wireless tag according to the first embodiment includes a lead wire which, when placed inside a metal pipe, forms a coaxial line together with the metal pipe. The wireless tag having such a lead wire allows a radiowave or electromagnetic wave (hereinafter simply called the radiowave) radiated as an interrogation signal from a reader/writer to propagate into the metal pipe, thus enabling the reader/writer to read information from the wireless tag.

Figure 1:
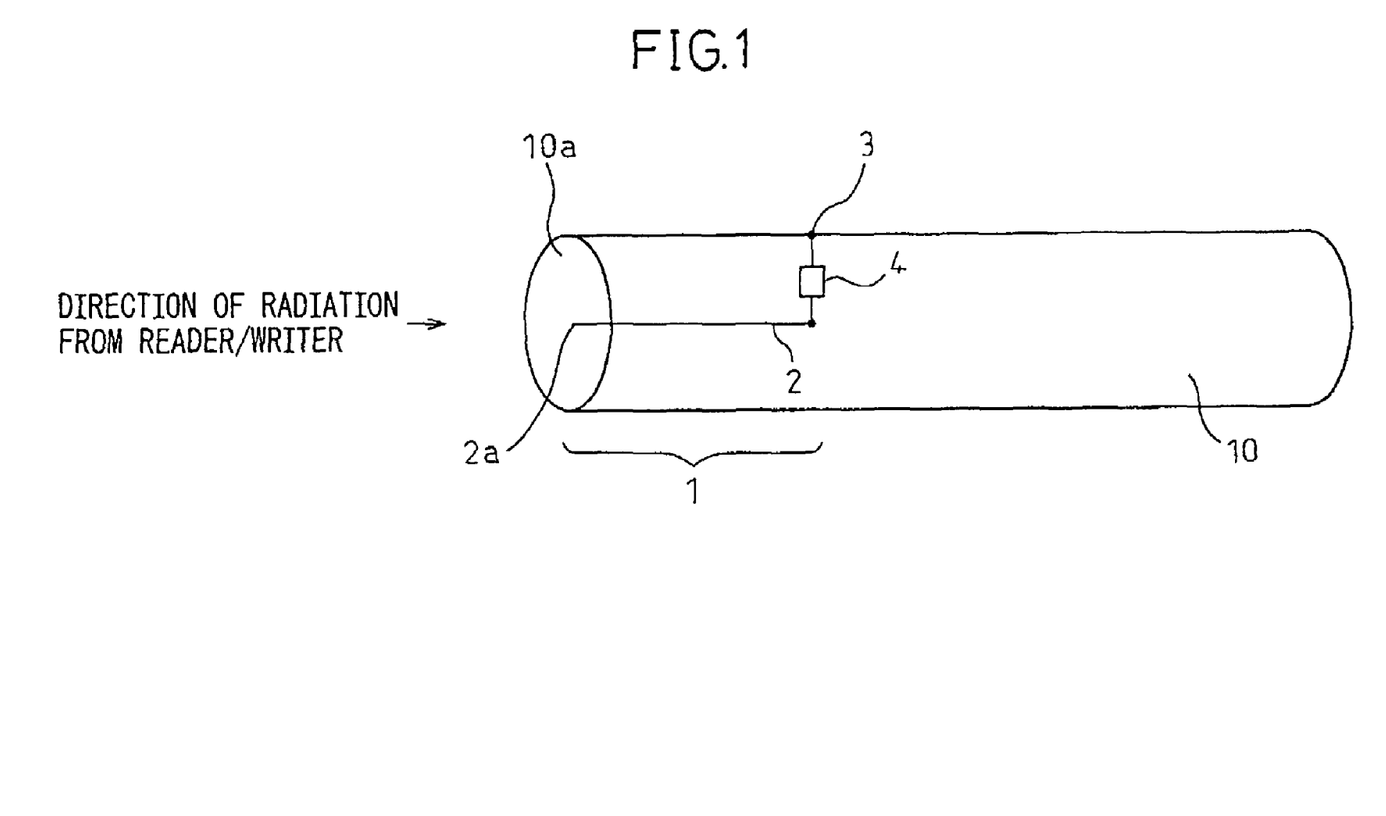
FIG. 1 is a schematic diagram depicting a circuit formed when a wireless tag according to a first embodiment is mounted in a metal pipe.

FIG. 1 is a schematic diagram depicting a circuit formed when the wireless tag according to the first embodiment is mounted in a metal pipe. As illustrated in FIG. 1, the wireless tag 1 mounted inside the metal pipe 10 includes a lead wire 2, an electrically conductive contact 3 in contact with the inside wall of the metal pipe, and a wireless tag chip 4.

The lead wire 2 is formed from an electrically conductive material such as copper or iron. The lead wire 2 is routed along the center axis of the inner diameter of the metal pipe 10 so as not to contact the metal pipe 10. One end 2a of the lead wire 2 is located inwardly of an open end 10a of the metal pipe 10 so as not to protrude outside the metal pipe 10. Yet, the one end 2a of the lead wire 2 is positioned near enough to the opening 10a so as to fall within the range of the radiowave radiated from the reader/writer (not illustrated) and propagating into the metal pipe 10 through its opening 10a.

The lead wire 2 and the metal pipe 10 together form a coaxial line. Accordingly, even when the radiowave radiated from the reader/writer has a frequency lower than the cutoff frequency of the metal pipe 10, the radiowave can propagate into the metal pipe 10 along the lead wire 2.

Further, the diameter of the lead wire 2 is chosen so that the characteristic impedance of the coaxial line formed by the metal pipe 10 and lead wire 2 matches the characteristic impedance of space outside the metal pipe 10. Here, if there is only air between the metal pipe 10 and the lead wire 2, the characteristic impedance of the coaxial line formed by the metal pipe 10 and lead wire 2 can be obtained by the following equation.

$$Z = 60 \ln \frac{b}{a} \tag{2}$$

where a and b represent the radius of the lead wire 2 and the inner radius of the metal pipe 10, respectively. As is known, the characteristic impedance of space is about 377Ω. Accordingly, when the inner radius of the metal pipe 10 is 30 mm, for example, then from the above equation, the above two characteristic impedances can be made to match each other by setting the radius of the lead wire 2 to about 0.05 mm.

Figure 2A:
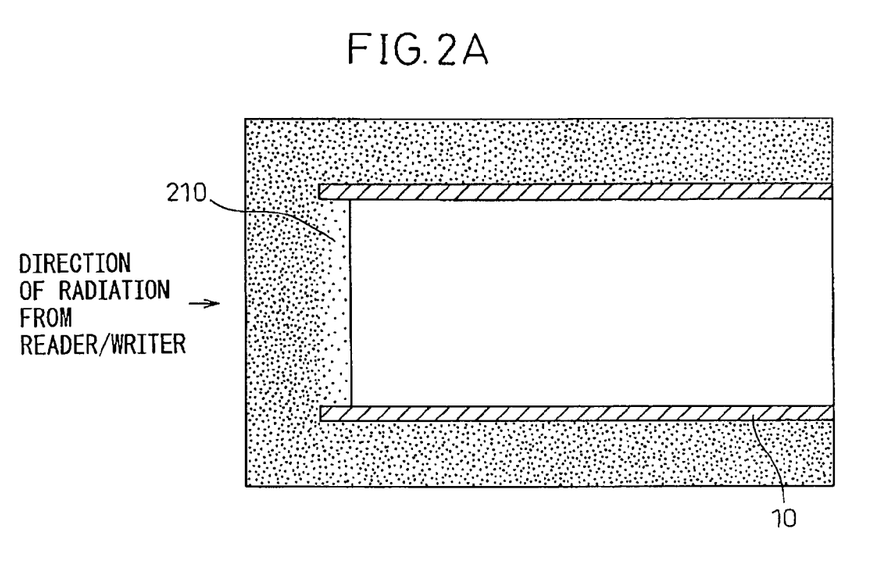
FIG. 2A is a schematic diagram illustrating an electric field intensity produced when there is no lead wire in the metal pipe.
Figure 2B:
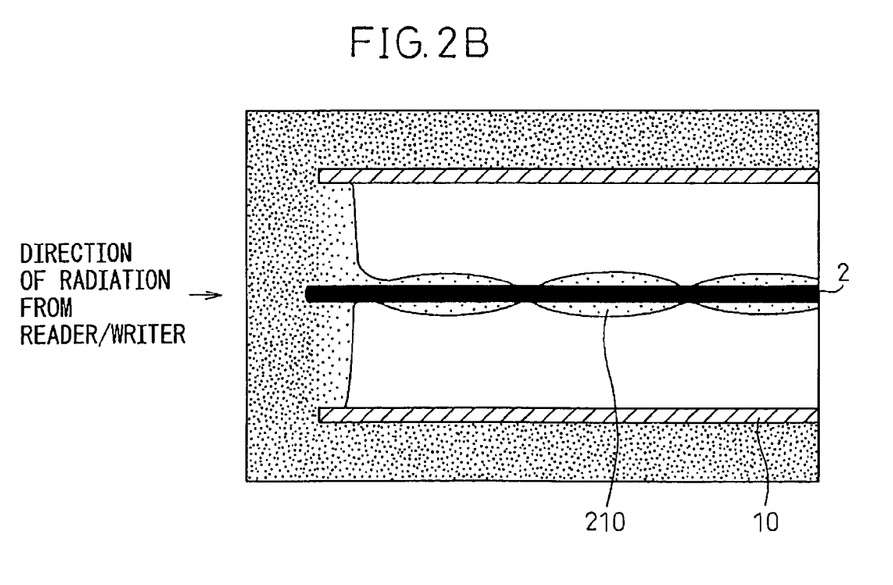
FIG. 2B is a schematic diagram illustrating an electric field intensity produced when a lead wire having a thickness that can be impedance matched to the characteristic impedance of space is placed inside the metal pipe.

FIGS. 2A and 2B each depict the simulation result of the electric field intensity produced in the metal pipe 10 by the radiowave radiated from the reader/writer. In the illustrated example, the inner radius of the metal pipe 10 is 30 mm, and the reader/writer is located at a distance of 500 mm from the open end of the metal pipe 10. The equivalent isotropic radiated power of the reader/writer is 4 W (4 W EIRP), and the frequency of the radiated radiowave is 953 MHz. FIG. 2A depicts a schematic diagram of the electric field intensity produced when there is no lead wire 2 in the metal pipe 10, and FIG. 2B depicts a schematic diagram of the electric field intensity produced when the lead wire 2 having a thickness that can be impedance matched to the characteristic impedance of space is placed inside the metal pipe 10.

As illustrated in FIG. 2A, when there is no lead wire 2 in the metal pipe 10, the region 210 where the electric field intensity is 1 V/m or higher only extends about 30 mm inward from the open end and, in the area further inside the pipe, the electric field intensity drops below 1 V/m. Usually, an electric field intensity of 1 V/m or higher is required for the wireless tag to respond. Accordingly, if the wireless tag is mounted in the area more than 30 mm inward from the open end of the metal pipe 10, the wireless tag cannot respond to the reader/writer.

On the other hand, as illustrated in FIG. 2B, when the lead wire 2 is placed inside the metal pipe 10, the region 210 where the electric field intensity is 1 V/m or higher extends along the lead wire 2, and it is thus seen that the radiowave radiated from the reader/writer is transmitted into the interior area of the metal pipe 10.

The wireless tag chip 4 includes a rectifier circuit, a memory, a microprocessor unit, etc. in order to implement the function of the wireless tag. The wireless tag chip 4 is an integrated circuit into which these component elements are integrated. In the present embodiment, the wireless tag chip 4 employs a so-called passive system. Therefore, in the wireless tag chip 4, the interrogation signal received from the reader/writer is converted by the rectifier circuit into a DC voltage which is used to power up the microprocessor unit, etc. Then, when the interrogation signal is received from the reader/writer, the microprocessor reads from the memory an identification code for distinguishing the wireless tag 1 from other wireless tags, and generates a response signal by modulating the interrogation signal with the identification code. Here, it will be noted that an active type or a semi-active type wireless tag chip that generates a response wave by using power supplied from a built-in battery may be used as the wireless tag chip 4 in the wireless tag of the present embodiment. Further, the frequency of the radiowaves used for communications between the wireless tag and the reader/writer may be suitably chosen from the frequencies used in RFID systems; for example, 953 MHz in the UHF range may be used.

The wireless tag chip 4 has two terminals that are connected to the rectifier circuit. One of the two terminals is electrically connected to the lead wire 2. The other of the two terminals is electrically connected to the metal pipe 10 via the contact 3. A circuit is thus formed connecting the lead wire 2, the wireless tag chip 4, the contact 3, and the metal pipe 10 in this order. Since the radiowave can propagate inside the metal pipe 10 along the lead wire 2 as earlier described, the open end 10a of the metal pipe 10 functions as an antenna of the wireless tag 1. In this way, the tag 1 can receive the interrogation signal from the reader/writer and transmit the response signal to the reader/writer.

Figure 3A:
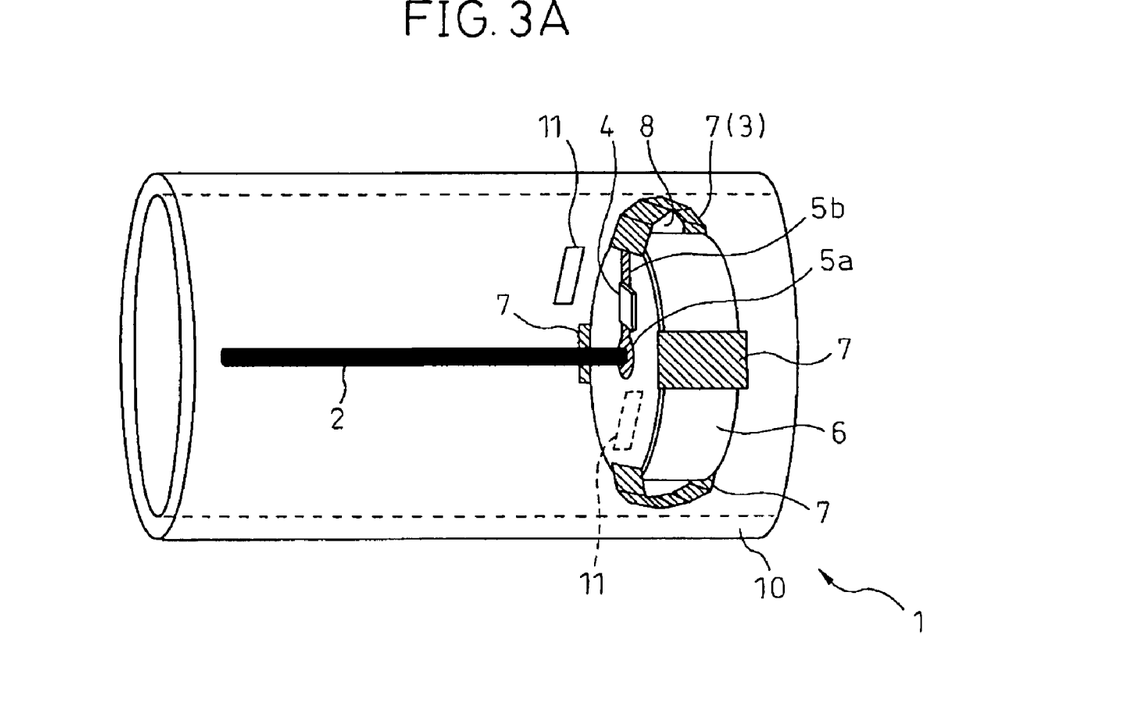
FIG. 3A is a schematic perspective view of the wireless tag according to the first embodiment having a mounting device for mounting the tag to the metal pipe.
Figure 3B:
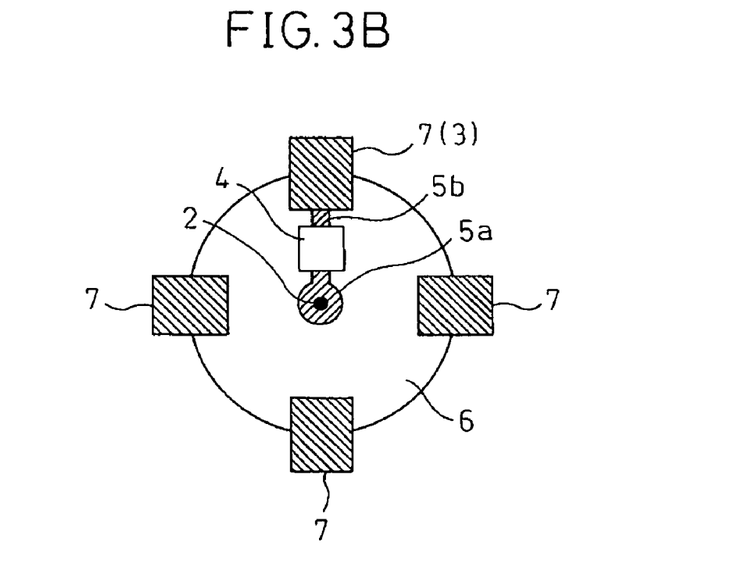
FIG. 3B is a schematic plan view of the wireless tag according to the first embodiment.

FIGS. 3A and 3B are respectively a schematic perspective view of the wireless tag 1 according to the present embodiment having a mounting device for mounting the tag to the metal pipe 10, and a schematic plan view of the wireless tag 1 as viewed from the open end side of the metal pipe 10. As illustrated in FIGS. 3A and 3B, the wireless tag 1 includes, in addition to the lead wire 2 and the wireless tag chip 4, a circular substrate 6 and a plurality of springs 7 for mounting them in position.

The circular substrate 6 is formed from an insulating material. Printed wiring lines 5a and 5b are formed on the surface of the circular substrate 6. A hole for holding the lead wire 2 is formed approximately in the center of the surface of the circular substrate 6, and one end of the printed wiring line 5a is formed in such a manner as to encircle the hole. The lead wire 2 is inserted in the hole and is thus attached to the substrate 6. Further, the lead wire 2 is fixedly connected, at the end thereof attached to the substrate 6, to the printed wiring line 5a by an electrically conductive material such as solder. Here, various other known methods may be used to attach the lead wire 2 to the substrate 6 for electrical connection to the printed wiring line 5a.

The wireless tag chip 4 is also mounted on the surface of the circular substrate 6, and the two terminals connected to the rectifier circuit on the wireless tag chip 4 are electrically connected to the printed wiring lines 5a and 5b, respectively.

The plurality of springs 7 are arranged at equally spaced intervals around the circumference of the circular substrate 6. When the wireless tag 1 is mounted inside the metal pipe 10, each spring 7 acts to fix the wireless tag 1 to the inside of the metal pipe 10 by exerting a restoring force so as to press against the inside wall of the metal pipe 10. One of the plurality of springs 7 is electrically connected to the printed wiring line 5b, and is formed from an electrically conductive material so that it functions as the contact 3. In this way, since the spring that functions as the contact 3 is formed so as to press against the inside wall of the metal pipe 10, the above-described circuit can be reliably formed.

Further, a protrusion 11 that fits into the gap 8 formed between the spring 7 and the circular substrate 6 may be formed on the inside wall of the metal pipe 10. Then, by positioning the gap 8 with respect to the protrusion 11, and fitting the protrusion 11 into the gap 8, the wireless tag 1 can be fixed in the designated position inside the metal pipe 10. Further, by fixing the wireless tag 1 in this way, the wireless tag 1 can be prevented from coming off the metal pipe 10. The designated position is located, for example, near the position where the amplitude of the electric field propagating inside the metal pipe 10 becomes maximum, and such a position can be determined in advance by performing a known simulation for radiowave propagation.

Figure 4:
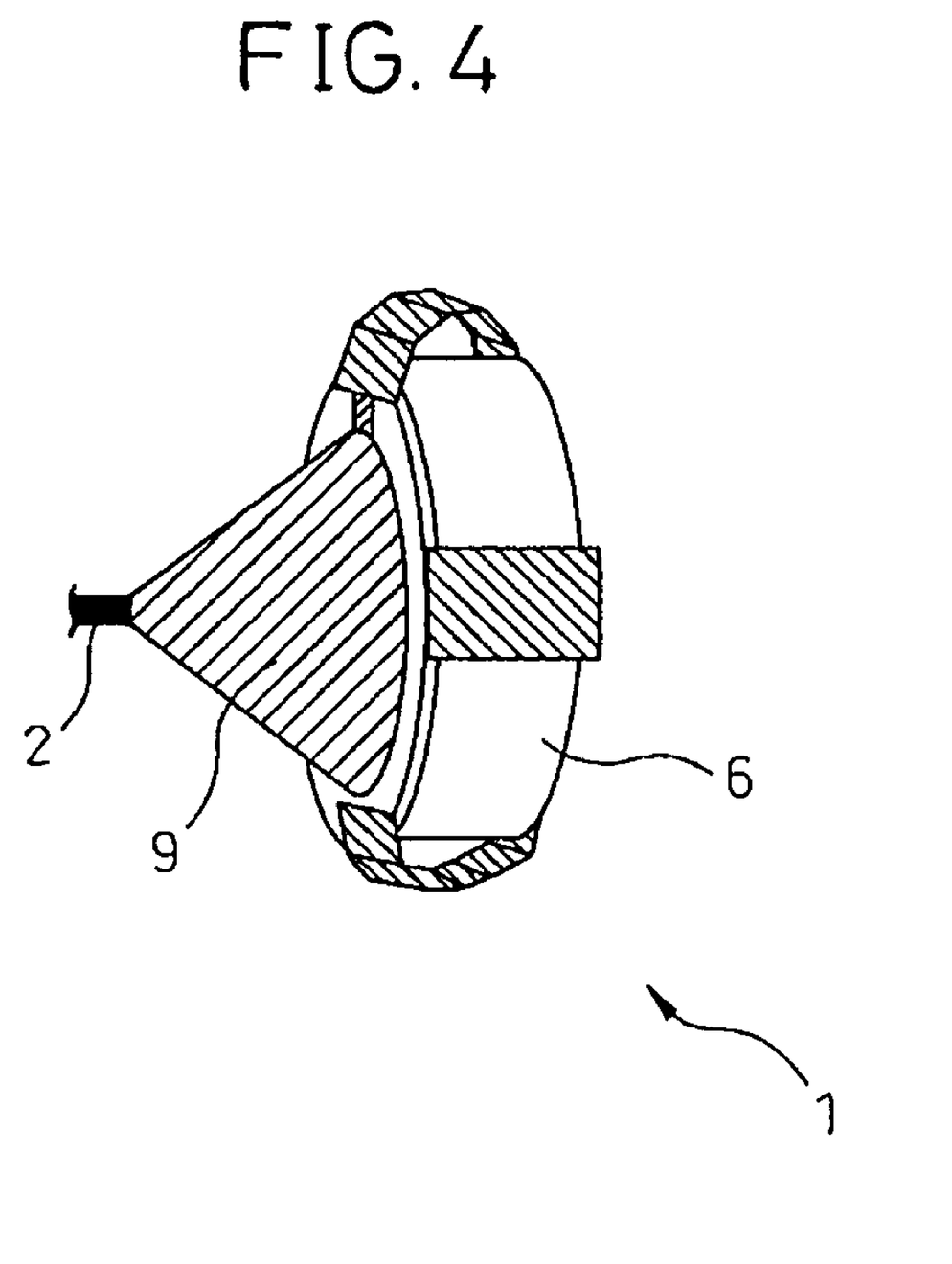
FIG. 4 is a schematic diagram depicting a structure in which a reinforcing material is applied to the lead wire mounting portion of a substrate.

FIG. 4 depicts a schematic perspective view of another example of the wireless tag in which a reinforcing member is provided for preventing the lead wire from coming off the substrate. As illustrated in FIG. 4, the reinforcing member 9 made of a resin or the like is provided on the surface of the substrate 6 where the lead wire 2 is to be attached, and then the lead wire 2 is fixed as illustrated; in this way, the lead wire 2 can be prevented from coming off the substrate 6. Further, the mounting portion of the lead wire 2 may be protected by covering the entire circumference of the lead wire 2 with an insulating material such as resin. In this case, the thickness of the lead wire 2 must be adjusted according to the dielectric constant of the insulating material in order to match the characteristic impedance of space outside the metal pipe to the characteristic impedance inside the metal pipe. Here, by assuming that the metal pipe is a circular waveguide forming a coaxial line, the characteristic impedance inside the metal pipe can be obtained by a known equation, and therefore, a detailed description will not be given here.

Figure 5A:
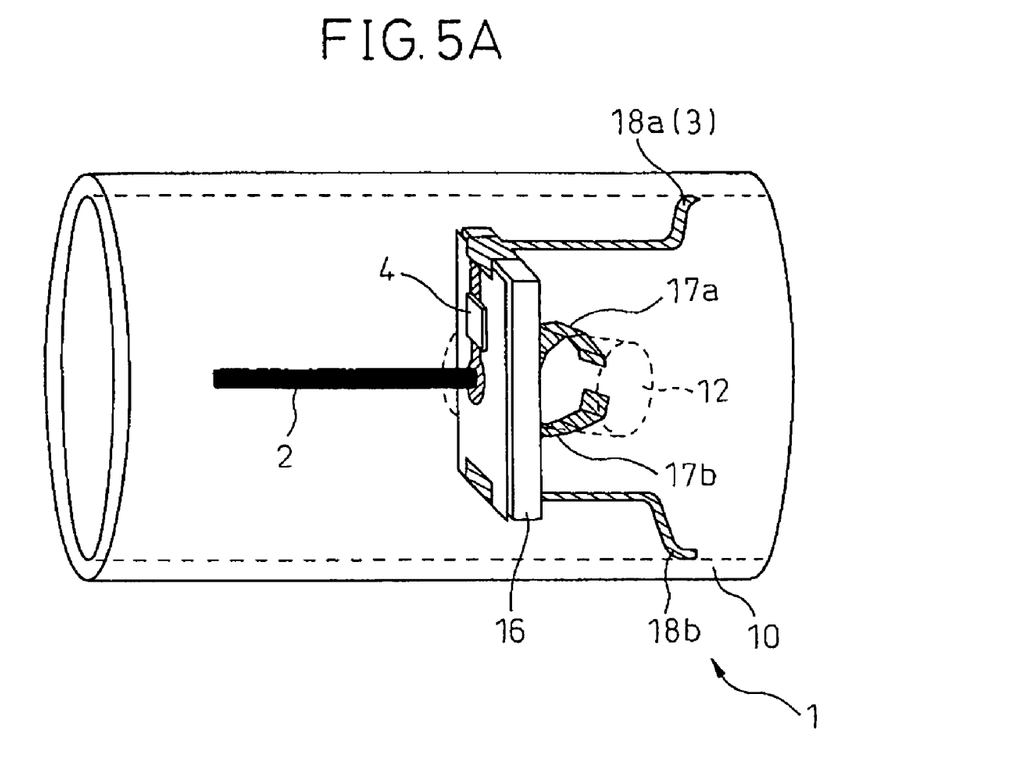
FIG. 5A is a schematic perspective view of the wireless tag according to the first embodiment having an alternative mounting device for mounting the tag to the metal pipe.
Figure 5B:
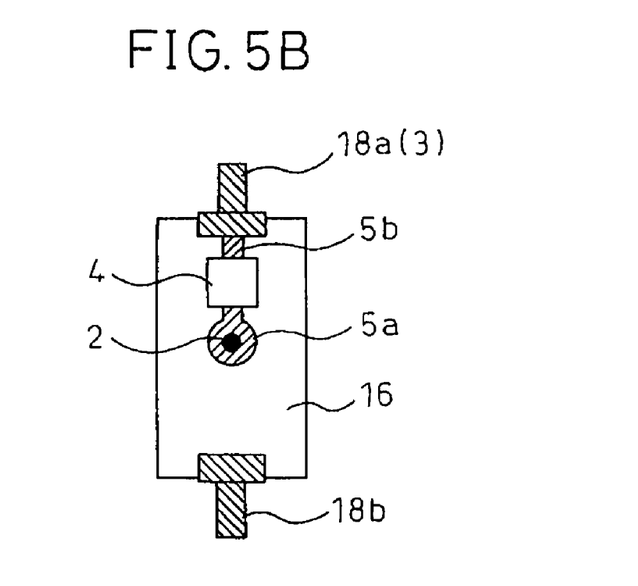
FIG. 5B is a schematic plan view of the wireless tag according to the first embodiment.

FIGS. 5A and 5B are respectively a schematic perspective view of the wireless tag 1 having an alternative mounting device for mounting the tag to the metal pipe 10, and a schematic plan view of the wireless tag 1 as viewed from the open end side of the metal pipe 10. In the example illustrated in FIGS. 5A and 5B, the wireless tag 1 is fixed to a rod-like stopper 12 provided inside the metal pipe 10. To achieve this, the wireless tag 1 includes, in addition to the lead wire 2, wireless tag chip 4, and printed wiring lines 5a and 5b described above, an insulating substrate 16, engaging members 17a and 17b, and contact members 18a and 18b for mounting them in position. The arrangement of the lead wire 2, wireless tag chip 4, and printed wiring lines 5a and 5b on the substrate 16 is substantially the same as that for the example of the wireless tag illustrated in FIG. 3, and therefore, the description will not be repeated here.

The engaging members 17a and 17b are provided on the back of the substrate 16. As the wireless tag 1 is moved inwardly into the metal pipe 10 for mounting, the gap between the ends of the engaging members 17a and 17b opens and closes to conform with the surface shape of the rod-like stopper 12. Then, the substrate 16 is fixed in position with the engaging members 17a and 17b engaging the rod-like stopper 12 from above and below.

The contact member 18a is provided above the substrate 16, while the contact member 18b is provided below the substrate 16. The contact members 18a and 18b are each formed from an electrically conductive material such as a metal. Further, each of the contact members 18a and 18b is formed in the shape of a leaf spring whose end exerts a restoring force so as to press against the inside wall of the metal pipe 10. The contact member 18a is electrically connected to the printed wiring line 5b, and thus functions as the contact 3. This ensures the reliable formation of the earlier described circuit.

For the wireless tag 1 of FIGS. 5A and 5B also, a reinforcing member made of a resin or the like may be applied on the surface of the substrate 6 where the lead wire 2 is to be attached, in order to fixedly hold the lead wire 2 and prevent it from coming off the substrate 16. Further, the mounting portion of the lead wire 2 may be protected by covering the entire circumference of the lead wire 2 with an insulating material such as resin.

As described above, the wireless tag according to the first embodiment includes the lead wire which, when placed inside the metal pipe, forms a coaxial line together with the metal pipe. The thus configured wireless tag allows the radiowave radiated from the reader/writer to propagate into the metal pipe. Accordingly, even when the wireless tag is mounted inside the metal pipe in order to prevent the breakage or removal of the wireless tag, the wireless tag can respond to the reader/writer installed outside the metal pipe. Furthermore, the end of the lead wire need not be made to protrude outwardly from the open end of the metal pipe in order to enable the wireless tag to communicate with the reader/writer. This serves to prevent the lead wire from contacting some other object when the metal pipe is being transported or when it is being connected to another metal pipe. Accordingly, the lead wire is prevented from breaking or from being subjected to an excessive load and causing the wireless tag connected to it to disconnect. Moreover, when mounting the wireless tag of the present embodiment inside the metal pipe, there is no need to apply any special processing to the metal pipe itself in order to enable the wireless tag to respond to the reader/writer. The wireless tag can therefore be used with any existing metal pipe.

Next, a wireless tag according to a second embodiment will be described.

Figure 6:
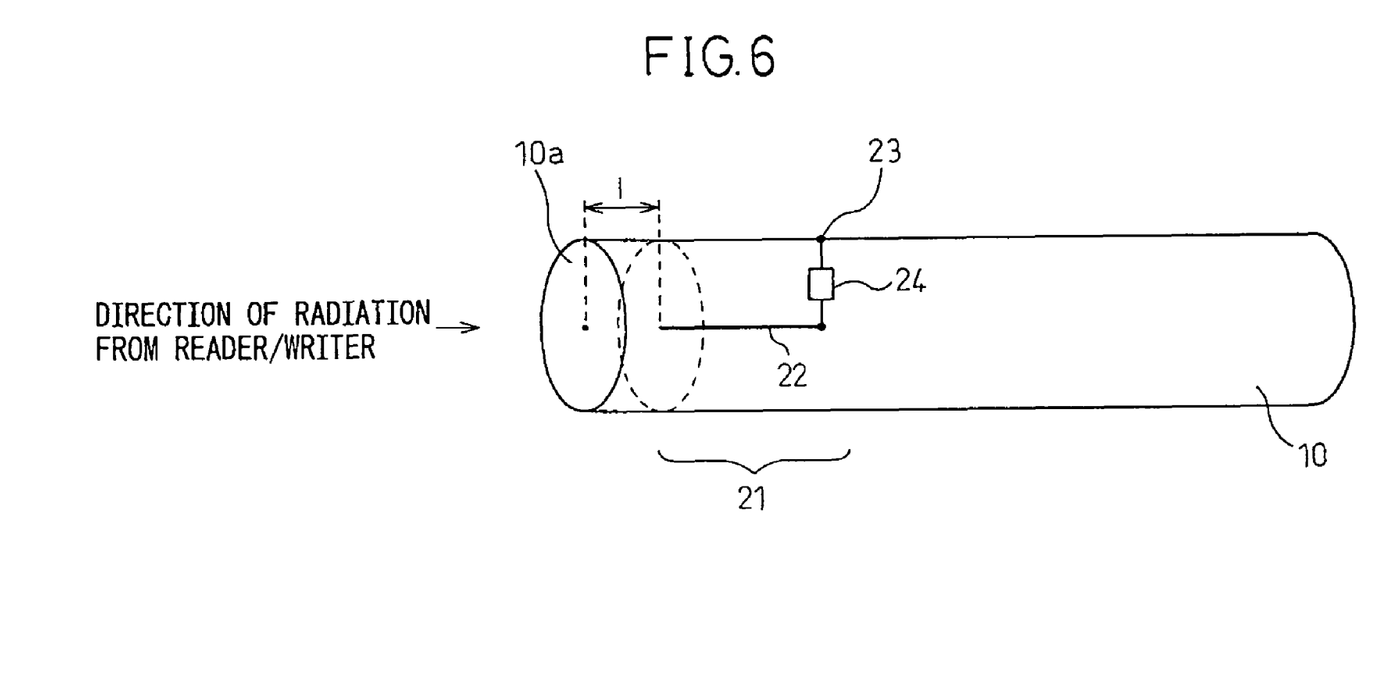
FIG. 6 is a schematic diagram depicting a circuit formed when a wireless tag according to a second embodiment is mounted in a metal pipe.

FIG. 6 is a schematic diagram depicting a circuit formed when the wireless tag according to the second embodiment is mounted in a metal pipe. As illustrated in FIG. 6, the wireless tag 21 according to the second embodiment includes a lead wire 22, an electrically conductive contact 23 in contact with the inside wall of the metal pipe, and a wireless tag chip 24. The wireless tag 21 of the second embodiment is similar in configuration to the wireless tag 1 of the first embodiment, except for the shape of the lead wire 22. The wireless tag 21 also can be mounted to the metal pipe by applying any one of the configurations illustrated in FIGS. 3 to 5. The following description therefore deals only with the lead wire 22.

In the wireless tag 21 of the second embodiment, the diameter of the lead wire 22 for forming the coaxial line is made larger than that of the lead wire 2 of the wireless tag 1 of the foregoing embodiment, thereby aiming to increase the design accuracy and the manufacturing accuracy of the lead wire 22.

As can be seen from the earlier given equation (2), as the diameter of the lead wire 22 increases, the characteristic impedance of the coaxial line formed by the metal pipe 10 and lead wire 22 decreases. In view of this, in the present embodiment, the length of the lead wire 22 is adjusted so that the end 22a of the lead wire 22 is located inwardly of the open end 10a of the metal pipe 10 by the length required to match the characteristic impedance of the coaxial line to the characteristic impedance of space outside the metal pipe 10. For convenience, the length from the open end 10a of the metal pipe 10 to the end 22a of the lead wire 22 will hereinafter be called the impedance matching length.

The impedance matching length l can be determined by performing a known simulation for characteristic impedance analysis. For example, when the inner radius of the metal pipe 10 is 30 mm, and the diameter of the lead wire 22 is 1.5 mm, the impedance matching length l is given as 30 mm. The impedance matching length l can be increased as the inner radius of the metal pipe 10 is increased.

An example of design using a simulation will be illustrated below. The voltage that develops between the terminals of the tag chip due to the radiated electric field from the reader/writer is calculated using an electromagnetic field simulator based on a moment method or an FDTD method that solves Maxwell's equations. When the thickness of the wire lead 22 that is feasible to manufacture is predetermined, the impedance matching length l can be determined by optimizing it so that the voltage that develops between the terminals of the tag chip becomes maximum.

As described above, according to the wireless tag of the second embodiment, since the diameter of the lead wire that forms the coaxial line together with the metal pipe can be made larger than when the lead wire is extended close to the open end of the metal pipe, the design accuracy and the manufacturing accuracy of the lead wire can be enhanced. The increased diameter of the lead wire further serves to increase the strength of the lead wire itself. As a result, the wireless tag of the second embodiment can be made to have a structure more difficult to break than the wireless tag of the first embodiment. Furthermore, when the wireless tag is mounted in the metal pipe, the end of the lead wire is located inwardly spaced apart from the open end of the metal pipe by a distance equal to the impedance matching length. Thus, the wireless tag of the second embodiment has the added advantage of making it easier to prevent the lead wire from accidentally contacting some other object and causing the wireless tag to break or disconnect from the metal pipe.

Next, a description will be given of a wireless tag according to a third embodiment that can enhance the impedance matching performance.

Figure 7:
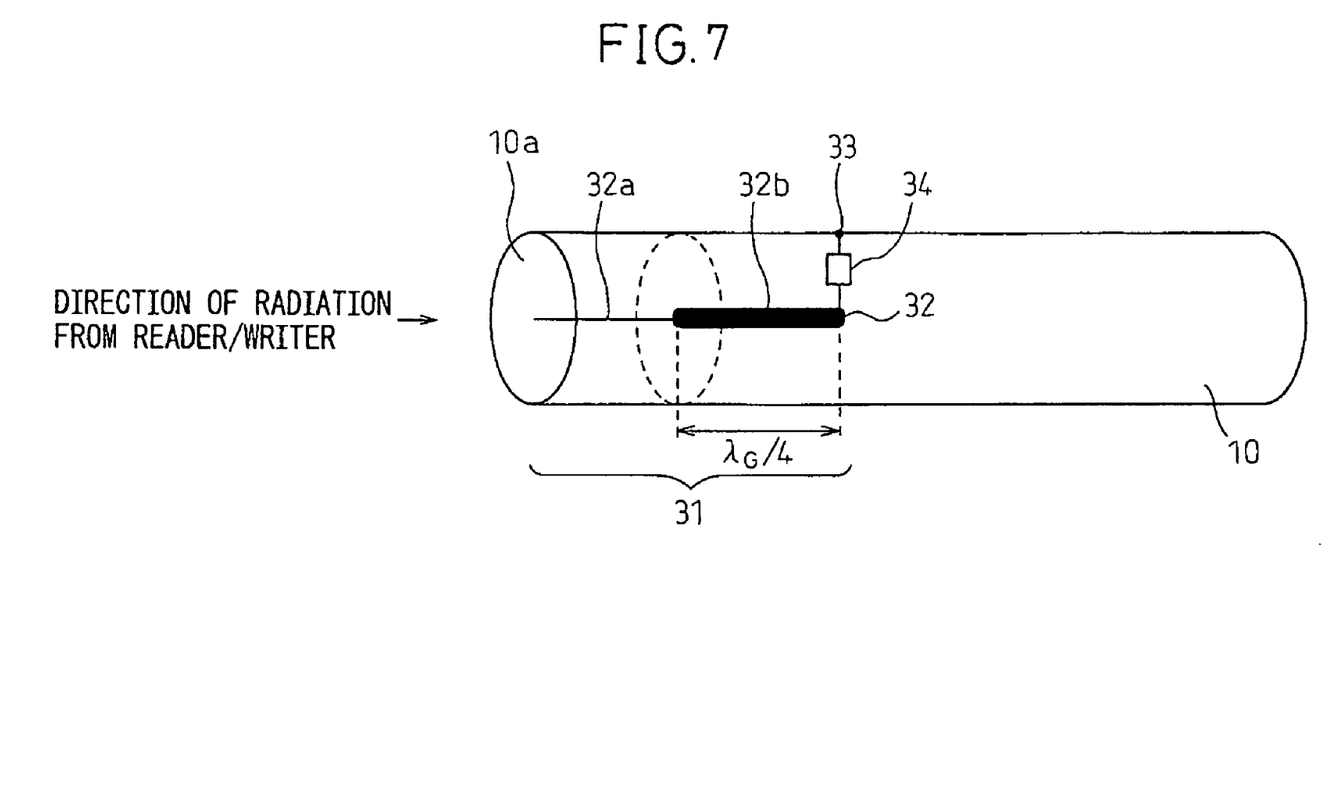
FIG. 7 is a schematic diagram depicting a circuit formed when a wireless tag according to a third embodiment is mounted in a metal pipe.

FIG. 7 is a schematic diagram depicting a circuit formed when the wireless tag according to the third embodiment is mounted in a metal pipe. As illustrated in FIG. 7, the wireless tag 31 according to the third embodiment includes a lead wire 32, an electrically conductive contact 33 in contact with the inside wall of the metal pipe, and a wireless tag chip 34. The wireless tag 31 of the third embodiment is similar in configuration to the wireless tag 1 of the first embodiment, except for the shape of the lead wire 32. The wireless tag 31 also can be mounted to the metal pipe by applying any one of the configurations illustrated in FIGS. 3 to 5. The following description therefore deals only with the lead wire 32.

In the third embodiment, the lead wire 32 has a thin wire section 32a located on the open end 10a side of the metal pipe 10 and a thick wire section 32b located on the wireless tag chip 34 side. The end of the thin wire section 32a is positioned near the open end 10a of the metal pipe 10, like that of the lead wire 2 of the wireless tag 1 of the embodiment illustrated in FIG. 1. The length of the thin wire section 32a corresponds to the impedance matching length. Further, like the lead wire 2 of the wireless tag 1, the diameter of the thin wire section 32a is chosen so that the characteristic impedance of the coaxial line formed by the metal pipe 10 and thin wire section 32a matches the characteristic impedance of space outside the metal pipe 10.

On the other hand, the length of the thick wire section 32b corresponds to one quarter of the wavelength $\lambda_G$ of the radiowave propagating inside the metal pipe 10 (hereinafter called the guided wavelength $\lambda_G$). When the characteristic impedance of the coaxial line in the thin wire section 32a is denoted by $Z_1$, the characteristic impedance of the coaxial line in the thick wire section 32b by $Z_0$, and the characteristic impedance of the wireless tag chip 34 by $Z_2$, then the diameter of the thick wire section 32b is chosen so as to satisfy the following relation.

$$Z_0 = \sqrt{Z_1 Z_2} \qquad (3)$$

In the wireless tag 31 of the third embodiment, by varying the diameter of the lead wire in a step-like manner as described above, the characteristic impedance of the coaxial line section can be transformed so as to achieve good matching to the characteristic impedance of the wireless tag chip 34.

Next, a description will be given of a wireless tag according to a fourth embodiment that can enhance the impedance matching performance.

Figure 8:
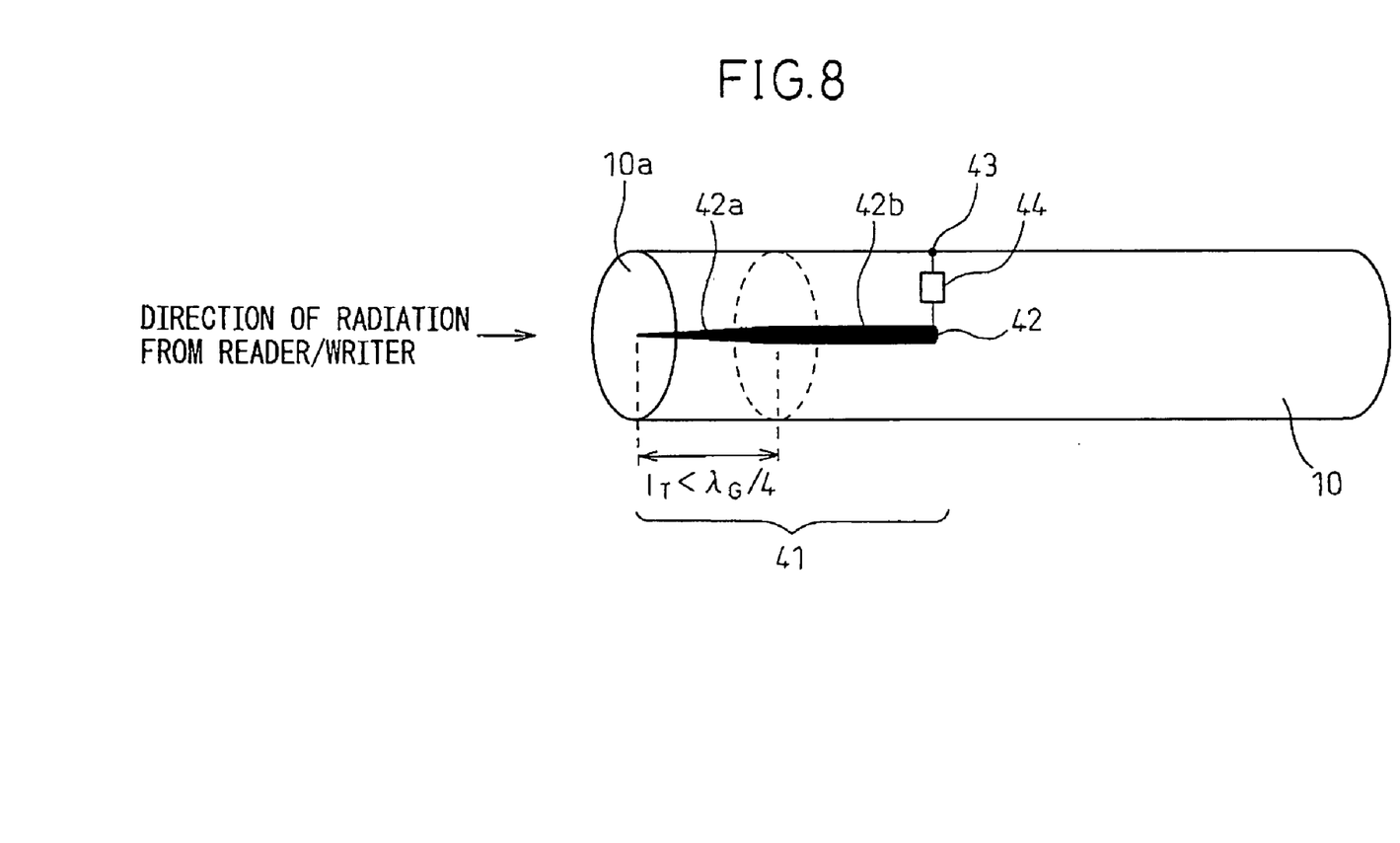
FIG. 8 is a schematic diagram depicting a circuit formed when a wireless tag according to a fourth embodiment is mounted in a metal pipe.

FIG. 8 is a schematic diagram depicting a circuit formed when the wireless tag according to the fourth embodiment is mounted in a metal pipe. As illustrated in FIG. 8, the wireless tag 41 according to the fourth embodiment includes a lead wire 42, an electrically conductive contact 43 in contact with the inside wall of the metal pipe, and a wireless tag chip 44. The wireless tag 41 of the fourth embodiment is similar in configuration to the wireless tag 1 of the first embodiment, except for the shape of the lead wire 42. The wireless tag 41 also can be mounted to the metal pipe by applying any one of the configurations illustrated in FIGS. 3 to 5. The following description therefore deals only with the lead wire 42.

In the fourth embodiment, the lead wire 42 has an impedance transforming section 42a located on the open end 10a side of the metal pipe 10 and an impedance matching section 42b located on the wireless tag chip 44 side. Here, the diameter of the impedance matching section 42b is chosen so that the characteristic impedance of the impedance matching section 42b matches the characteristic impedance of the wireless tag chip 44.

On the other hand, the end of the impedance transforming section 42a is positioned near the open end 10a of the metal pipe 10, like that of the lead wire 2 of the wireless tag 1 of the first embodiment. The diameter at the end of the impedance transforming section 42a is chosen so that the characteristic impedance of the coaxial line formed by the metal pipe 10 and lead wire 42 near the open end 10a of the metal pipe 10 matches the characteristic impedance of space outside the metal pipe 10.

The length $l_T$ of the impedance transforming section 42a is set smaller than one quarter of the guided wavelength $\lambda_G$. The impedance transforming section 42a has a tapered shape with its diameter gradually increasing from its end toward the impedance matching section 42b. At the portion joining the impedance matching section 42b, the impedance transforming section 42a has the same diameter as the impedance matching section 42b. In this way, the characteristic impedance of the coaxial line at the open end 10a of the metal pipe 10 is transformed by the impedance transforming section 42a to the characteristic impedance of the coaxial line in the impedance matching section 42b.

Accordingly, in the wireless tag 41 of the fourth embodiment, by varying the diameter of the lead wire in a tapered manner as described above, the characteristic impedance of the coaxial line can be transformed so as to achieve good matching to the characteristic impedance of the wireless tag chip 34.

Next, a description will be given of wireless tags according to fifth and sixth embodiments that can reduce the standing wave of the radiowave propagating inside the metal pipe.

Figure 9A:
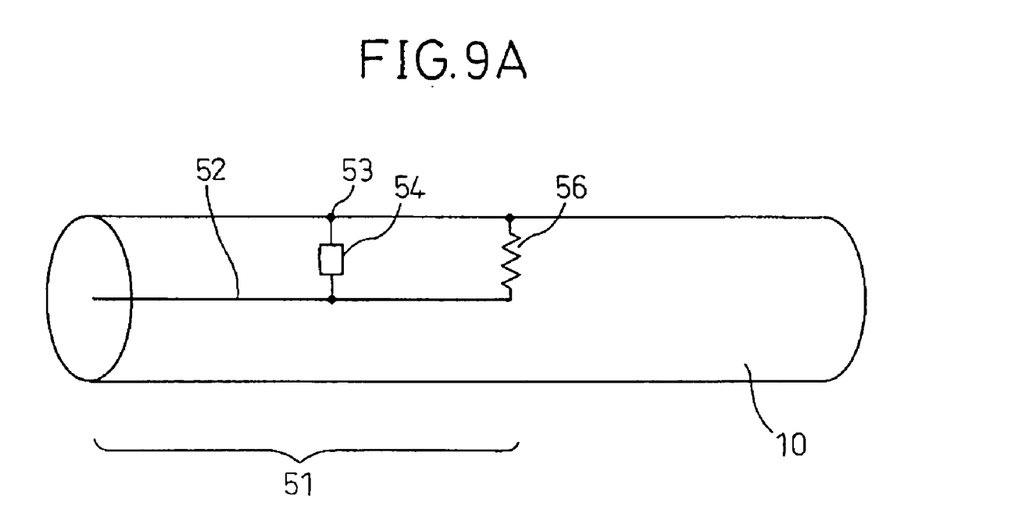
FIG. 9A is a schematic diagram depicting a circuit formed when a wireless tag according to a fifth embodiment is mounted in a metal pipe.
Figure 9B:
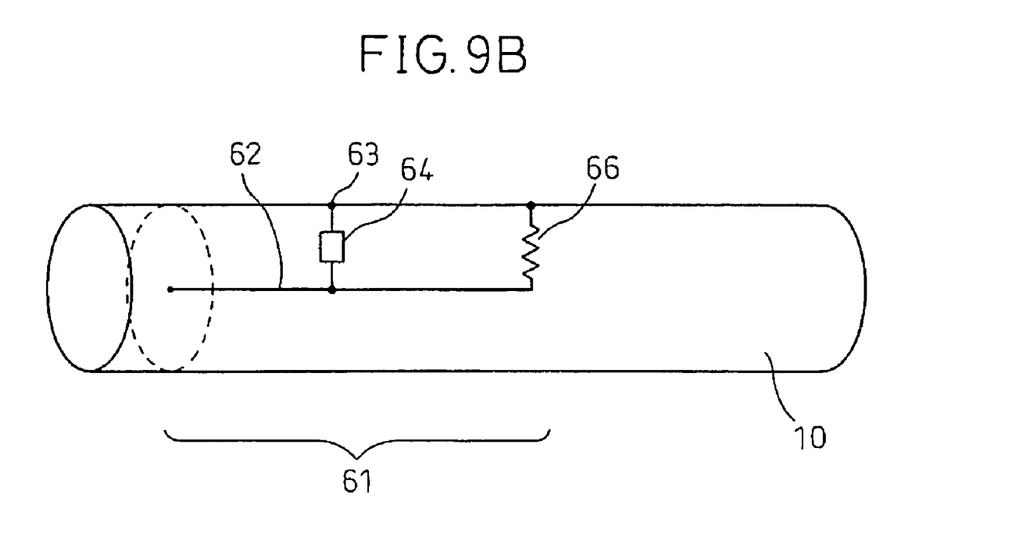
FIG. 9B is a schematic diagram depicting a circuit formed when a wireless tag according to a sixth embodiment is mounted in a metal pipe.

FIGS. 9A and 9B are schematic diagrams each depicting a circuit formed when the wireless tag according to the fifth embodiment or the sixth embodiment, respectively, is mounted in a metal pipe. The wireless tag 51 according to the fifth embodiment illustrated in FIG. 9A includes a lead wire 52, an electrically conductive contact 53 in contact with the inside wall of the metal pipe 10, a wireless tag chip 54, and a termination resistor 56. The wireless tag 51 only differs from the wireless tag 1 of the first embodiment by the inclusion of the termination resistor 56. The following description therefore deals only with the termination resistor 56.

The termination resistor 56 has the same characteristic impedance as that of the coaxial line formed by the lead wire 52 and metal pipe 10. The termination resistor 56 is connected between the lead wire 52 and the metal pipe 10 in parallel with the wireless tag chip 54. When the wireless tag 51 has the same configuration as that of the embodiment illustrated in FIG. 3, for example, the termination resistor 56 is provided on the substrate 6. Then, the printed wiring line 5a is extended to electrically connect to one end of the termination resistor 56, and the other end of the termination resistor 56 is electrically connected to one of the springs 7 via another printed wiring line formed so as not to contact the printed wiring lines 5a and 5b.

In like manner, the wireless tag 61 according to the sixth embodiment illustrated in FIG. 9B includes a lead wire 62, an electrically conductive contact 63 in contact with the inside wall of the metal pipe 10, a wireless tag chip 64, and a termination resistor 66. The wireless tag 61 only differs from the wireless tag 21 of the second embodiment by the inclusion of the termination resistor 66.

The termination resistor 66, like the termination resistor 56 of the wireless tag 51 of the fifth embodiment, has the same characteristic impedance as that of the coaxial line formed by the lead wire 62 and metal pipe 10. The termination resistor 66 is connected between the lead wire 62 and the metal pipe 10 in parallel with the wireless tag chip 64.

By providing such a termination resistor, the tag 51 or 61 can suppress the reflections of the radiowave received by the coaxial line formed by the lead wire 52 or 62 and metal pipe 10. As a result, the standing wave of the radiowave propagating along the lead wire 52 or 62 decreases. Accordingly, the electric field intensity produced by the radiowave propagating inside the metal pipe 10 along the lead wire 2 can be made relatively uniform irrespective of the distance from the open end of the metal pipe 10 or of the guided wavelength $\lambda_G$. Further, the length of the lead wire 52 or 62 can be set as desired.

Thus, the wireless tags 51 and 61 according to the fifth and sixth embodiments provide greater freedom in terms of the installation position of the wireless tag chips 54 and 64, making it easier to work when installing the wireless tag in the metal pipe.

The present invention is not limited to the specific embodiments described above. For example, in each of the above embodiments, the lead wire that forms the coaxial line together with the metal pipe may be routed off the center axis extending in the longitudinal direction of the metal pipe, provided that the lead wire does not directly contact the metal pipe. Further, the metal pipe in which the wireless tag of each of the above embodiments is mounted need not necessarily be limited to a circular shape, but may have a polygonal cross-sectional shape such as a rectangular shape or a hexagonal shape. For example, in the case of a pipe having a rectangular cross-sectional shape, the cutoff frequency fc is given as $3 \times 10^5/2a$ (MHz), where a is the length of the longer side of the open end. Therefore, in the case of an RFID system in which the frequency of the interrogation wave radiated from the reader/writer lies in the UHF range, the interrogation signal does not propagate into the pipe, unless the longer side a is set longer than 157 mm. In this way, even when the frequency of the interrogation signal is lower than the cutoff frequency fc, the above-described wireless tag can be mounted inside the pipe, and the interrogation signal can be made to propagate into the pipe so that the wireless tag can respond to the interrogation signal.

Furthermore, the pipe in which the wireless tag disclosed in the present application is mounted need not necessarily be limited to a metal pipe. The wireless tag disclosed in the present application can be used with any pipe, provided that the pipe is a hollow pipe formed from an electrically conductive material.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless tag adapted for mounting inside a hollow electrically conductive pipe, comprising:
    a contact placed in contact with said electrically conductive pipe so as to be electrically connected to said electrically conductive pipe;
    a lead wire placed inside said electrically conductive pipe along a longitudinal direction of said electrically conductive pipe and spaced a prescribed distance away from an inside wall of said electrically conductive pipe, thereby forming a coaxial line together with said electrically conductive pipe; and
    a wireless tag circuit, electrically connected at one end to said contact and at the other end to said lead wire, for generating a response signal in response to an interrogation signal transmitted from a reader/writer.

2. The wireless tag according to claim 1, further comprising a resistor connected between said lead wire and said electrically conductive pipe in parallel with said wireless tag circuit, said resistor having a characteristic impedance equal to the characteristic impedance of said coaxial line.

3. The wireless tag according to claim 1, wherein an end of said lead wire is located inside said electrically conductive pipe so as to be inwardly spaced apart from an open end of said electrically conductive pipe by a distance equal to a length required to match the characteristic impedance of said coaxial line to the characteristic impedance of space outside said electrically conductive pipe.

4. The wireless tag according to claim 3, further comprising a resistor connected between said lead wire and said electrically conductive pipe in parallel with said wireless tag circuit, said resistor having a characteristic impedance equal to the characteristic impedance of said coaxial line.

5. The wireless tag according to claim 1, wherein said lead wire is formed so that the diameter of said lead wire at an end thereof connected to said wireless tag circuit becomes larger than the diameter of said lead wire at an end thereof near an open end of said electrically conductive pipe, and the characteristic impedance of said coaxial line is transformed by said lead wire so as to match the characteristic impedance of said wireless tag circuit.

6. The wireless tag according to claim 5, wherein the diameter of said lead wire increases in a step-like manner toward the end thereof connected to said wireless tag circuit.

7. The wireless tag according to claim 5, wherein said lead wire has an impedance transforming section whose diameter increases in a tapered manner from the end thereof near the open end of said electrically conductive pipe toward the end thereof connected to said wireless tag circuit.

8. An electrically conductive pipe comprising:
    a hollow electrically conductive pipe member;
    a contact electrically connected to said pipe member;
    a lead wire placed inside said pipe member along a longitudinal direction of said pipe member and spaced a prescribed distance away from an inside wall of said pipe member, thereby forming a coaxial line together with said pipe member; and
    a wireless tag circuit, electrically connected at one end to said contact and at the other end to said lead wire, for generating a response signal in response to an interrogation signal transmitted from a reader/writer.

* * * * *